United States Patent
Funo et al.

(10) Patent No.: US 11,609,728 B2
(45) Date of Patent: Mar. 21, 2023

(54) SYSTEM FOR CHANGING WIRELESS COMMUNICATION SETTINGS AT RESERVED LOCATIONS

(71) Applicant: FUJIFILM BUSINESS INNOVATION CORP., Tokyo (JP)

(72) Inventors: Hiroyuki Funo, Kanagawa (JP); Satoru Tsuto, Kanagawa (JP); Nobuyuki Yamazoe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 502 days.

(21) Appl. No.: 16/586,052

(22) Filed: Sep. 27, 2019

(65) Prior Publication Data
US 2020/0364011 A1    Nov. 19, 2020

(30) Foreign Application Priority Data
May 14, 2019    (JP) .............................. JP2019-091242

(51) Int. Cl.
  *G06F 15/00*    (2006.01)
  *G06F 3/12*    (2006.01)
  *G06K 1/00*    (2006.01)

(52) U.S. Cl.
CPC .......... *G06F 3/1236* (2013.01); *G06F 3/1204* (2013.01); *G06F 3/126* (2013.01); *G06F 3/1238* (2013.01); *G06F 3/1285* (2013.01); *G06F 3/1292* (2013.01)

(58) Field of Classification Search
CPC .... G06F 3/1236; G06F 3/1204; G06F 3/1238; G06F 3/126; G06F 3/1285; G06F 3/1292
USPC ............................... 358/1.15, 1.13, 1.1, 1.14
See application file for complete search history.

(56) References Cited

U.S. PATENT DOCUMENTS

| | | | |
|---|---|---|---|
| 9,107,141 B2 | 8/2015 | Lai et al. | |
| 10,949,143 B2* | 3/2021 | Kimura | ................. G06F 3/1236 |
| 2019/0394628 A1* | 12/2019 | Suzuki | ................. G06F 3/1204 |

FOREIGN PATENT DOCUMENTS

| JP | 2003-304518 A | 10/2003 |
|---|---|---|
| JP | 2009-278396 A | 11/2009 |
| JP | 2010-63000 A | 3/2010 |
| JP | 2015-42005 A | 3/2015 |
| JP | 2016-171562 A | 9/2016 |

OTHER PUBLICATIONS

Jan. 17, 2023 Office Action issued in Japanese Patent Application No. 2019-091242.

* cited by examiner

*Primary Examiner* — Douglas Q Tran
(74) *Attorney, Agent, or Firm* — Oliff PLC (57) ABSTRACT

An information processing apparatus includes a changing unit. The changing unit changes a setting of wireless communication in a location in accordance with a user who has made a reservation for the location.

21 Claims, 7 Drawing Sheets

| LOCATION ID | APPARATUS ID | USE TIME | USER INFORMATION | WIRELESS-SETTINGS INFORMATION | UTILIZATION INFORMATION |
|---|---|---|---|---|---|
| A1 | B1 | 4/1 10:00 AM to 12:00 AM | C1 | D1 | E1 |
|  |  | 4/1 1:00 PM to 2:00 PM | C2 | D2 | E2 |
|  |  | ... | ... | ... | ... |
| ... | ... | ... | ... | ... | ... |

| LOCATION ID | APPARATUS ID | USE TIME | USER INFORMATION | WIRELESS-SETTINGS INFORMATION | UTILIZATION INFORMATION | DIFFERENT-USER INFORMATION |
|---|---|---|---|---|---|---|
| A1 | B1 | 4/1 10:00 AM to 12:00 AM | C1 | D1 | E1 | F1, F2 |
|  |  | 4/1 1:00 PM to 2:00 PM | C2 | D2 | E2 | F3, F4 |
|  |  | ... | ... | ... | ... | ... |
| ... | ... | ... | ... | ... | ... | ... |

SYSTEM FOR CHANGING WIRELESS COMMUNICATION SETTINGS AT RESERVED LOCATIONS

CROSS-REFERENCE TO RELATED APPLICATIONS

This application is based on and claims priority under 35 USC 119 from Japanese Patent Application No. 2019-091242 filed May 14, 2019.

BACKGROUND

(i) Technical Field

The present disclosure relates to an information processing apparatus, an information processing system, and a non-transitory computer readable medium.

(ii) Related Art

Public wireless communication is used by users typically by using settings such as a password which are prepared in advance.

Japanese Unexamined Patent Application Publication No. 2015-42005 describes a method of establishing a connection, on the basis of wireless LAN access point data in a short message, with a corresponding wireless LAN access point.

Japanese Unexamined Patent Application Publication No. 2010-63000 describes an apparatus which monitors authentication of wireless terminal devices and the state of access to wireless LAN access points by using signals at the ports of a switching hub.

When settings such as a password are fixed, security in use of wireless communication may be decreased.

SUMMARY

Aspects of non-limiting embodiments of the present disclosure relate to a technique of improving security in use of wireless communication compared with the case in which fixed settings are used in use of wireless communication.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a changing unit. The changing unit changes a setting of wireless communication in a location in accordance with a user who has made a reservation for the location.

BRIEF DESCRIPTION OF THE DRAWINGS

Exemplary embodiments of the present disclosure will be described in detail based on the following figures, wherein.

DETAILED DESCRIPTION

Figure 1:
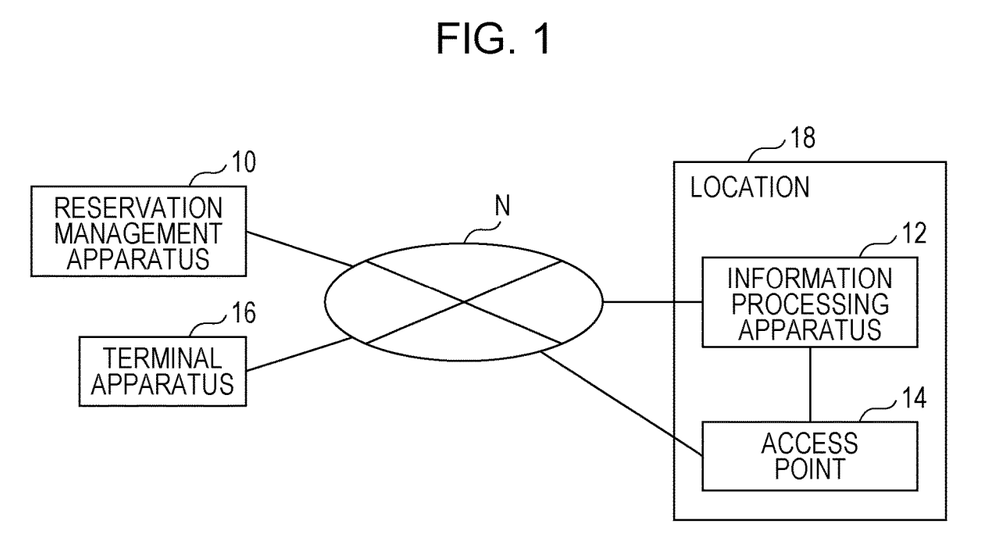
FIG. 1 is a block diagram illustrating the configuration of an information processing system according to the present exemplary embodiment.

An information processing system according to the present exemplary embodiment will be described below by referring to FIG. 1. FIG. 1 illustrates an exemplary configuration of the information processing system according to the present exemplary embodiment.

The information processing system according to the present exemplary embodiment includes a reservation management apparatus 10, one or more information processing apparatuses 12, one or more access points 14, and one or more terminal apparatuses 16. The information processing system may include an apparatus other than these.

The reservation management apparatus 10, the information processing apparatuses 12, the access points 14, and the terminal apparatuses 16 may communicate to another apparatus through a communication path N. Examples of the communication path N include a network such as a local area network (LAN) and the Internet. The communication path N may be formed by using wired communication, or may be formed by using wireless communication such as Wireless Fidelity (Wi-Fi®). The reservation management apparatus 10, the information processing apparatuses 12, the access points 14, and the terminal apparatuses 16 use, for example, wireless communication or wired communication to establish connections with the communication path N, and communicate with other apparatuses through the communication path N. The reservation management apparatus 10, the information processing apparatuses 12, the access points 14, and the terminal apparatuses 16 may communicate with other apparatuses, not through the communication path N, for example, by using short-distance wireless communication. Examples of the short-distance wireless communication include Bluetooth™, radio frequency identifier (RFID), and near field communication (NFC).

The reservation management apparatus 10 is configured so as to manage reservations for locations 18. For example, when a reservation for use of a location 18 for a certain time frame is made, the user who has made the reservation is permitted to use the location 18 during the time frame, and a user who has not made the reservation is not permitted to use the location 18 during the time frame. The reserved time frame may also be referred to as "use time" and may be defined, for example, by a date and a time period.

Each of the locations 18 is, for example, a booth, an office such as a shared office, a hotel room, a seat in transportation (for example, a car, a train, a plane, or a bus), a part or all of a building, or a public location. As a matter of course, a location other than these may be a location 18.

The reservation management apparatus 10 manages reservations for one or more locations 18. The locations 18 may be located far apart from each other. For example, the reservation management apparatus 10 may manage booths located at different places, and each reservation can reserve any particular booths managed by the reservation management apparatus 10.

Each of the information processing apparatuses 12 is configured so as to control communication available in a location 18. The communication may be wireless communication or wired communication. Hereinafter, for example, the communication is assumed to be wireless communication. For example, the information processing apparatus 12 is configured so as to control wireless communication available using an access point 14 in the location 18.

Each of the access points 14, which is a wireless communication apparatus, is configured so as to perform wireless communication with apparatuses (for example, terminal apparatuses 16) using the access point 14 and connect the apparatuses to a communication path such as the communication path N. For example, one or more access points 14 are available in each location 18. The access points 14 may be located in the location 18, or may be located around the location 18. For example, all or a part of a location 18 is included in the communication coverage (that is, a coverage in which reception/transmission of radio waves from/to an access point 14 may be performed) of the access point 14. This enables wireless communication using the access point 14 in all or a part of the location 18.

For example, an information processing apparatus 12 is located in or around a location 18, and controls an access point 14 available in the location 18. Thus, the information processing apparatus 12 controls wireless communication available using the access point 14. For example, the information processing apparatus 12 and the access point 14 are connected to each other through a wired communication path or a wireless communication path. The information processing apparatus 12 controls the access point 14 through the wired communication path or the wireless communication path. When the reservation management apparatus 10 manages reservations of multiple locations 18, an information processing apparatus 12 is provided for each location 18. For each location 18, the information processing apparatus 12 for the location 18 controls the access point 14 for the location 18. As a matter of course, a single information processing apparatus 12 may control multiple access points 14 (for example, access points 14 which are provided for corresponding locations 18).

Each of the terminal apparatuses 16 is, for example, an apparatus, such as a personal computer (hereinafter referred to as a "PC"), a tablet PC, a smartphone, or a cellular phone. For example, the terminal apparatus 16 is a portable terminal apparatus, such as a tablet PC, a smartphone, or a cellular phone.

Figure 2:
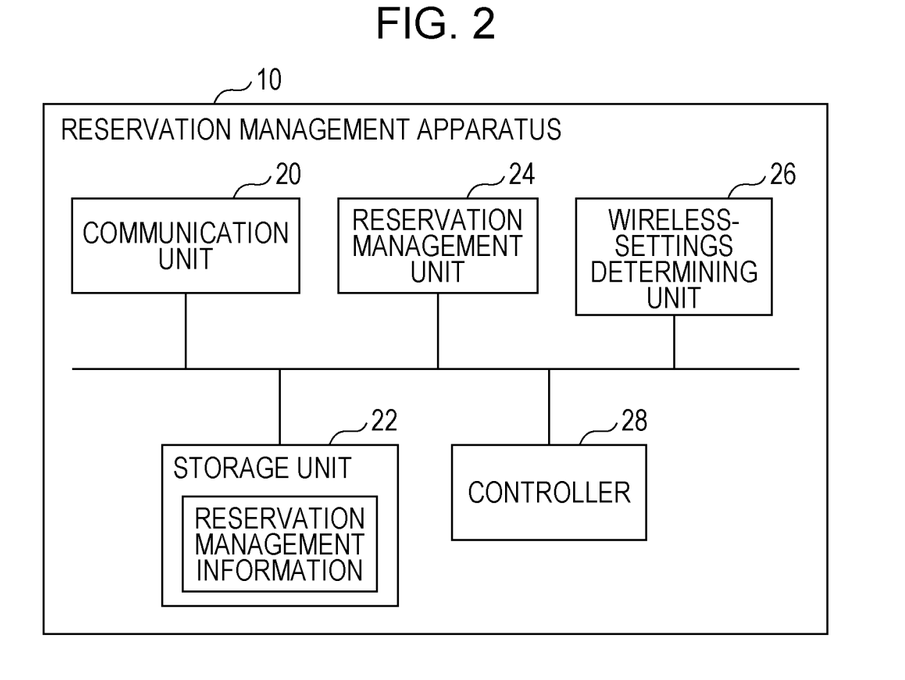
FIG. 2 is a block diagram illustrating the configuration of a reservation management apparatus according to the present exemplary embodiment.

The configuration of the reservation management apparatus 10 will be described below in detail by referring to FIG. 2. FIG. 2 illustrates an exemplary configuration of the reservation management apparatus 10.

A communication unit 20, which is a communication interface, has a function of transmitting information to other apparatuses and a function of receiving information from other apparatuses. The communication unit 20 may have a wireless communication function and/or a wired communication function. The communication unit 20 may use wireless communication or wired communication to establish a connection with the communication path N and communicate with other apparatuses through the communication path N. Alternatively, the communication unit 20 may use, for example, short-distance wireless communication to communicate with other apparatuses not through the communication path N.

A storage unit 22 indicates one or more storage areas in which various types of information are stored. Each storage area is formed, for example, of one or more storage devices (for example, physical drives, such as a hard disk drive and a memory) included in the reservation management apparatus 10.

The storage unit 22 stores reservation management information. The reservation management information is information for managing reservations for the locations 18. The reservation management information includes, for example, location identification information for identifying a location 18, use time information indicating a time frame reserved by each reservation, user information about a user who has made each reservation for the location 18, wireless-settings information about settings of wireless communication used in the location 18, and utilization information which is information necessary to use the location 18 during the time frame reserved by each reservation.

A reservation management unit 24 is configured so as to manage reservations for the locations 18. For example, the reservation management unit 24 receives a request for a reservation for a location 18 from a terminal apparatus 16, and registers the reservation for the location 18 in the reservation management information. The reservation management unit 24 permits a user, who has reserved the location 18, to use the location 18. When a time frame is specified by the reservation, the reservation management unit 24 permits the user to use the location 18 during the time frame.

A wireless-settings determining unit 26 is configured so as to determine settings of wireless communication available in the locations 18. For example, the wireless-settings determining unit 26 determines settings of wireless communication corresponding to a user who has reserved a location 18, as settings of wireless communication available in the location 18. For each reservation, the wireless-settings determining unit 26 may change settings of wireless communication. In the case where a user specifies settings of wireless communication when the user reserves a location 18, the wireless-settings determining unit 26 may determine settings of wireless communication specified by the user, as settings of wireless communication available in the location 18. Predetermined settings may be used as settings of wireless communication.

In the present exemplary embodiment, for example, the wireless-settings determining unit 26 determines settings of wireless communication of each access point 14. For example, the settings of wireless communication include at least one of identification information of the access point 14 and a password for using wireless communication via the access point 14. The identification information of an access point 14 is, for example, a service set identifier (SSID).

The settings of wireless communication may further include at least one of information about whether or not communication with other apparatuses through wireless communication using the same access point 14 is allowed and a communication speed. Typically, a function of prohibiting communication with other apparatuses through wireless communication using the same access point 14 is sometimes referred to, for example, as an SSID client isolating function, a separator-in-SSID function, a privacy separator, or a network isolating function. The SSID client isolating function is a function of prohibiting communication with apparatuses which are connected to an access point 14 having the same SSID.

Wireless-settings information, which indicates settings of wireless communication determined by the wireless-settings determining unit 26, is transmitted from the reservation management apparatus 10 to an information processing apparatus 12 and a terminal apparatus 16 used by a user who has reserved a location 18.

A controller 28 is configured so as to control operations of the units of the reservation management apparatus 10.

Figure 3:
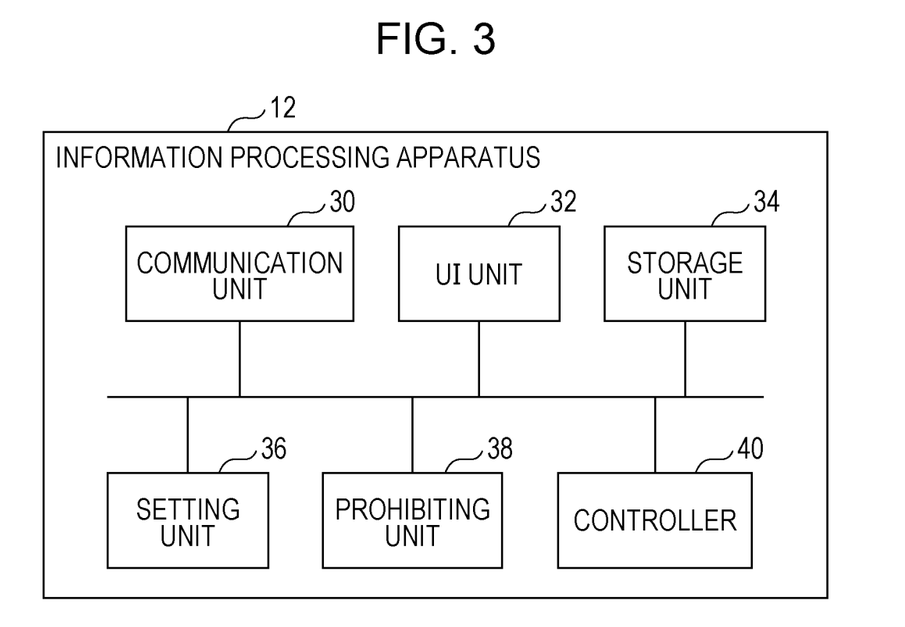
FIG. 3 is a block diagram illustrating the configuration of an information processing apparatus according to the present exemplary embodiment.

The configuration of each information processing apparatus 12 will be described in detail below by referring to FIG. 3. FIG. 3 illustrates an exemplary configuration of the information processing apparatus 12.

A communication unit 30, which is a communication interface, has a function of transmitting information to other apparatuses and a function of receiving information from other apparatuses. The communication unit 30 may have a wireless communication function and/or a wired communication function. The communication unit 30 may use wireless communication or wired communication to establish a connection with the communication path N and communicate with other apparatuses through the communication path N. Alternatively, the communication unit 30 may use, for example, short-distance wireless communication to communicate with other apparatuses not through the communication path N. The communication unit 30 communicates with access points 14 through a wired communication path or a wireless communication path. Through an access point 14, the communication unit 30 may communicate with other apparatuses using the access point 14. That is, the communication unit 30 may communicate with other apparatuses connected to the same access point 14. The communication unit 30 may communicate with other apparatuses not through an access point 14. In addition, the communication unit 30 may establish a connection with the communication path N or another communication path through an access point 14. Alternatively, the communication unit 30 may establish a connection with the communication path N or another communication path not through an access point 14.

A user interface (UI) unit 32, which is a user interface, includes a display unit and an operation unit. The display unit is a display apparatus such as a liquid-crystal display. The operation unit is an input apparatus, such as a keyboard, input keys, and an operation panel. The UI unit 32 may be a UI unit, such as a touch panel which includes a display unit and an operation unit. The UI unit 32 is not necessarily included in the information processing apparatus 12.

A storage unit 34 indicates one or more storage areas in which various types of information are stored. Each storage area is formed, for example, of one or more storage devices (for example, physical drives, such as a hard disk drive and a memory) included in the information processing apparatus 12.

A setting unit 36 is configured so as to set wireless communication available in the location 18. For example, the setting unit 36 changes settings of wireless communication available in the location 18, in accordance with a user who has reserved the location 18. In the present exemplary embodiment, for example, the setting unit 36 sets wireless communication via an access point 14. When the location 18 is reserved, wireless-settings information, which indicates settings of wireless communication via an access point 14 available in the location 18, is transmitted from the reservation management apparatus 10 to the information processing apparatus 12. The setting unit 36 sets wireless communication via the access point 14 according to the wireless-settings information. The setting unit 36 corresponds to an exemplary changing unit.

When a reservation for a use time, during which the location 18 may be used, has been made, after the arrival of the start time of the use time, the setting unit 36 may change settings of wireless communication in accordance with a user who has reserved the location 18.

After the arrival of the start time of a use time, when a user who has reserved the location 18 performs an operation for using the location 18, the setting unit 36 may change settings of wireless communication in accordance with the user who has made the reservation. For example, assume the case in which a booth, which is a location 18, is locked. After the arrival of the start time of a use time, when a user unlocks the booth, the setting unit 36 changes settings of wireless communication.

Settings of wireless communication may be changed by a user in a use time during which a location 18 may be used. For example, the SSID, the password, the settings for the SSID client isolating function, or the communication speed may be changed.

Settings of wireless communication may be determined by the setting unit 36. For example, when a location 18 is reserved, information indicating that the location 18 has been reserved is transmitted from the reservation management apparatus 10 to the information processing apparatus 12 in the location 18. Similarly to the wireless-settings determining unit 26 described above, the setting unit 36 in the information processing apparatus 12 determines settings of wireless communication via an access point 14. The wireless-settings information indicating the settings of wireless communication is transmitted from the information processing apparatus 12 to the reservation management apparatus 10. The wireless-settings information is transmitted from the reservation management apparatus 10 to the terminal apparatus 16 used by a user who has reserved the location 18.

A prohibiting unit 38 is configured so as to prohibit an apparatus's use of wireless communication via an access point 14 when a move of the apparatus, which uses the wireless communication via the access point 14, has not been detected in the location 18 over a predetermined time or more. For example, a move of an apparatus is detected on the basis of the strength of radio waves received/transmitted between the access point 14 and the apparatus. If the strength changes, it is determined that the apparatus is moving. Detection of a move of the apparatus is performed, for example, by a controller 40. For example, in the case where a camera having a wireless communication function is using wireless communication via the access point 14, when the camera has not been detected over the predetermined time or more, the camera may have been set up for secret photographing. The prohibiting unit 38 prohibits the camera from using wireless communication. Thus, transfer of data obtained through photographing using the camera may be prevented. The prohibiting unit 38 is not necessarily included in the information processing apparatus 12.

The controller 40 is configured so as to control operations of the units of the information processing apparatus 12.

Figure 4:
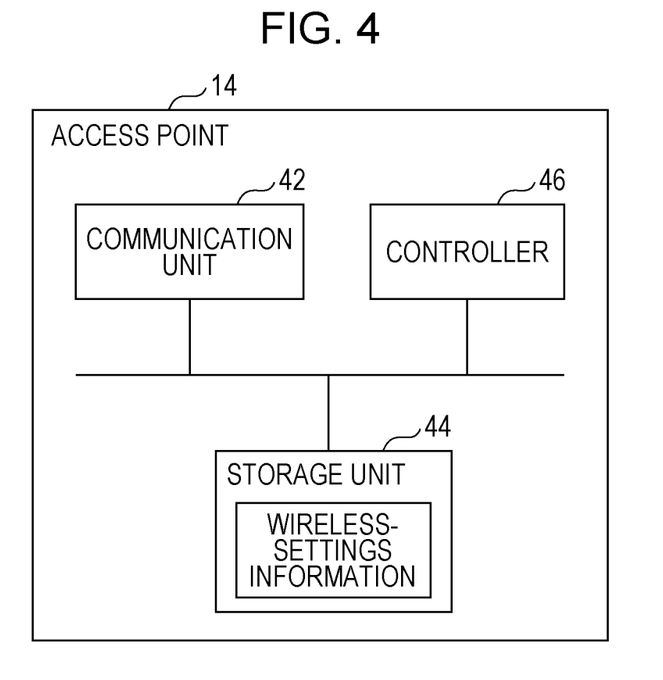
FIG. 4 is a block diagram illustrating the configuration of an access point.

The configuration of each access point 14 will be described below in detail by referring to FIG. 4. FIG. 4 illustrates an exemplary configuration of the access point 14.

A communication unit 42, which is a communication interface, has a function of transmitting information to other apparatuses and a function of receiving information from other apparatuses. The communication unit 42 has a wireless communication function. The communication unit 42 may further have a wired communication function. The communication unit 42 uses wireless communication or wired communication to establish a connection with the communication path N and communicate with other apparatuses through the communication path N. The communication unit 42 may use, for example, short-distance wireless communication to communicate with other apparatuses not through the communication path N. The communication unit 42 uses, for example, Wi-Fi to perform wireless communication with apparatuses (for example, terminal apparatuses 16) using the access point 14, and connect the apparatuses to a communication path such as the communication path N. The communication unit 42 communicates with an information processing apparatus 12 through a wired communication path or a wireless communication path.

A storage unit 44 indicates one or more storage areas in which various types of information are stored. Each storage area is formed, for example, of one or more storage devices (for example, physical drives, such as a hard disk drive and a memory) included in the access point 14.

The storage unit 44 stores wireless-settings information. The wireless-settings information is information about settings of wireless communication via the access point 14. The wireless-settings information includes at least identification information (for example, an SSID) of the access point 14 and a password for using wireless communication via the access point 14. The wireless-settings information may include, for example, information indicating settings of the SSID client isolating function and information indicating settings of the communication speed of wireless communication via the access point 14.

A controller 46 is configured so as to control operations of the units of the access point 14.

Figure 5:
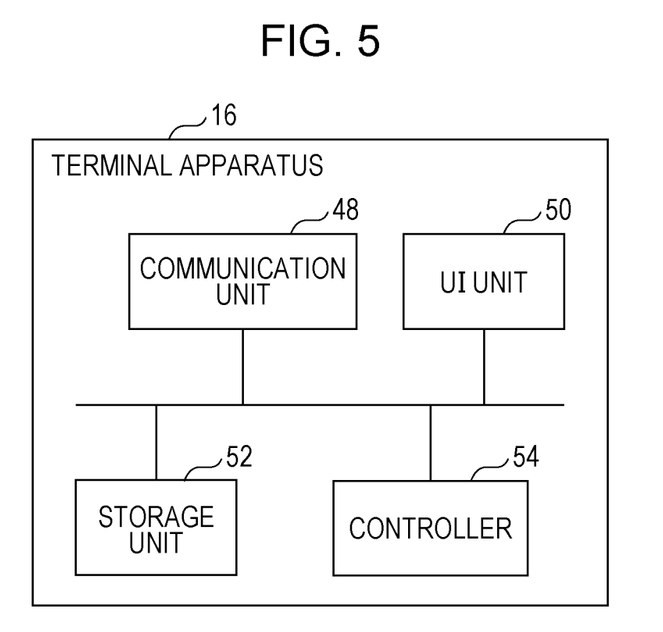
FIG. 5 is a block diagram illustrating the configuration of a terminal apparatus.

The configuration of each terminal apparatus 16 will be described in detail below by referring to FIG. 5. FIG. 5 illustrates an exemplary configuration of the terminal apparatus 16.

A communication unit 48, which is a communication interface, has a function of transmitting information to other apparatuses and a function of receiving information from other apparatuses. The communication unit 48 may have a wireless communication function and/or a wired communication function. The communication unit 48 may use wireless communication or wired communication to establish a connection with the communication path N and communicate with other apparatuses through the communication path N. Alternatively, the communication unit 48 may use, for example, short-distance wireless communication to communicate with other apparatuses not through the communication path N.

A UI unit 50, which is a user interface, includes a display unit and an operation unit. The display unit is a display apparatus such as a liquid-crystal display. The operation unit is an input apparatus, such as a keyboard, input keys, and an operation panel. The UI unit 50 may be a UI unit such as a touch panel including the display unit and the operation unit.

A storage unit 52 indicates one or more storage areas in which various types of information are stored. Each storage area is formed, for example, of one or more storage devices (for example, physical drives, such as a hard disk drive and a memory) included in the terminal apparatus 16.

A controller 54 is configured so as to control operations of the units of the terminal apparatus 16.

The information processing system according to the present exemplary embodiment will be described in more detail below.

Figure 6:
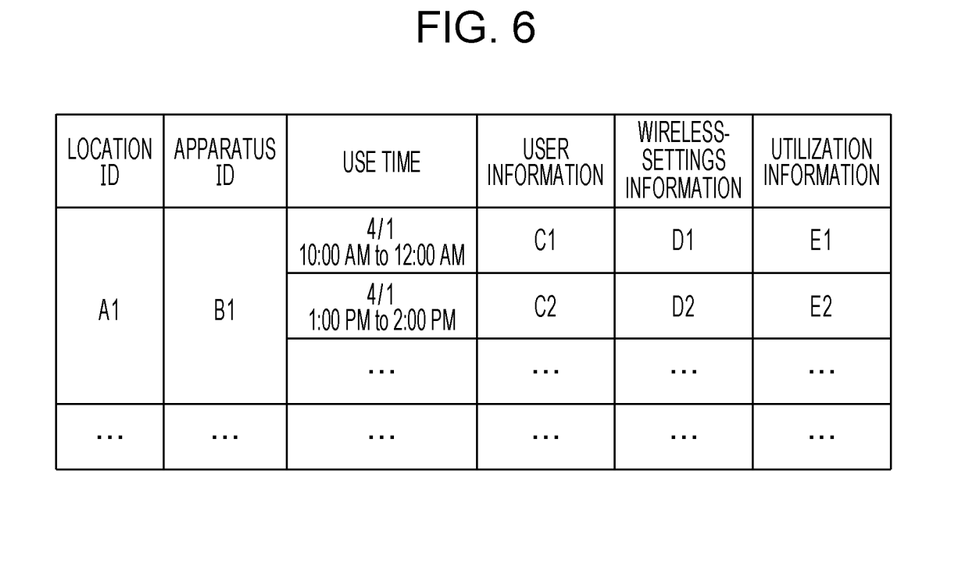
FIG. 6 is a diagram illustrating a reservation management table.

Exemplary reservation management information will be described by referring to FIG. 6. FIG. 6 illustrates an exemplary reservation management table which is exemplary reservation management information.

In the reservation management table, for each location 18, the location ID, the apparatus ID, use time information, user information, wireless-settings information, and utilization information are associated with one another.

The location ID is exemplary location identification information for identifying a location 18. The location identification information is predetermined for each location 18, and is associated in advance with the location 18. The location identification information is, for example, the location ID or information indicating the name of the location 18. Instead of the location ID, information indicating the name may be used as the location identification information.

The apparatus ID is exemplary apparatus identification information for identifying an information processing apparatus 12 controlling the access points 14 in the location 18. The apparatus identification information is predetermined for each information processing apparatus 12, and is associated in advance with the information processing apparatus 12. The apparatus identification information indicates, for example, the apparatus ID, information indicating the name of the information processing apparatus 12, or address information (for example, the IP address or the MAC address) of the information processing apparatus 12. Instead of the apparatus ID, information indicating the name or the address information may be used as the apparatus identification information.

The use time information is information indicating a use time during which the location 18 may be used. The use time is specified, for example, when a user makes a reservation for the location 18. For example, the date and the time period, during which a user uses the location 18, are specified.

The user information is information about a user who has reserved the location 18. The user information includes, for example, user identification information for identifying a user who has reserved the location 18, and terminal identification information for identifying a terminal apparatus 16 used by the user. The user identification information is, for example, information indicating the user ID, the name, the electronic mail address, or the account. The terminal identification information is, for example, address information (for example, the IP address or the MAC address) or the serial number of the terminal apparatus 16. For example, when the user makes a reservation for the location 18, the user information is transmitted from the terminal apparatus 16, which is used in making the reservation, to the reservation management apparatus 10.

The wireless-settings information is information about settings of wireless communication via an access point 14 used in the location 18. All or part of information included in the wireless-settings information may be determined by the reservation management apparatus 10, may be determined by the user who reserves the location 18, or may be determined by the information processing apparatus 12 in the reserved location 18.

The utilization information is information necessary to use the location 18 during the use time. The utilization information is, for example, information including a password or key information. When the location 18 is reserved, utilization information necessary to use the location 18 during a use time is generated by the reservation management unit 24, and is transmitted from the reservation management apparatus 10 to the terminal apparatus 16, which is used in making the reservation. The reservation management unit 24 generates, for example, utilization information different depending on a reservation. The user who uses the terminal apparatus 16 uses the utilization information so as to use the location 18. For example, when the location 18 is locked, the utilization information is used to unlock the location 18. The utilization information may be used to indicate that use of the location 18 is authorized. For example, when the location 18 is a seat, a vehicle, or the like, the utilization information may be used to indicate that use of the seat, the vehicle, or the like is authorized. When the location 18 is an open space or the like, or when an operation or the like to use the location 18 is not necessary, the utilization information is not necessarily used.

A concrete example of the reservation management table will be described. In a location 18 having the location ID "A1", an information processing apparatus 12 having the apparatus ID "B1" is located. The user C1 has reserved the location 18 having the location ID "A1". Its use time is April 1, 10:00 AM to 12:00 AM. The wireless settings D1 are set as settings of wireless communication which are used at that time. The wireless settings D1 for the user C1 may be determined by the user C1, or may be determined by the reservation management apparatus 10 or the information processing apparatus 12 automatically. The utilization information E1 is set as information for using the location 18 having the location ID "A1".

The user C2 has reserved the location 18 having the location ID "A1". Its use time is April 1, 1:00 PM to 2:00 PM. The wireless settings D2 are set as settings of wireless communication which are used at that time. The wireless settings D2 for the user C2 may be determined by the user C2, or may be determined by the reservation management apparatus 10 or the information processing apparatus 12 automatically. The utilization information E2 is set as information for using the location 18 having the location ID "A1".

Figure 7:
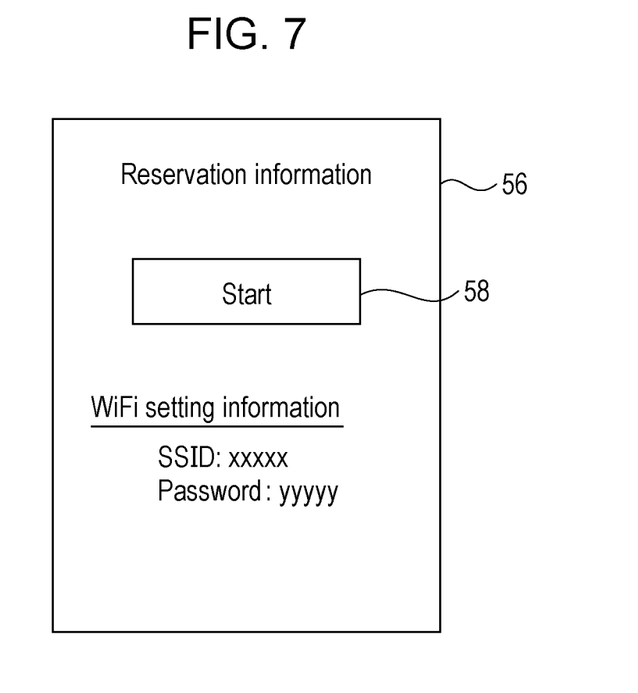
FIG. 7 is a diagram illustrating a screen.

A reservation completion screen will be described by referring to FIG. 7. FIG. 7 illustrates an exemplary reservation completion screen.

A reservation completion screen 56 is a screen displayed, for example, when a reservation of a location 18 is completed. As another example, the reservation completion screen 56 may be displayed at a time before a predetermined interval relative to the reserved use time.

A user uses a terminal apparatus 16 to reserve a location 18, and the reservation management apparatus 10 finishes processing the reservation. At that time, data of the reservation completion screen 56 is transmitted from the reservation management apparatus 10 to the terminal apparatus 16, and the reservation completion screen 56 is displayed on the display unit of the UI unit 50 of the terminal apparatus 16.

A reservation of a location 18 may be made, for example, in one of the following manners: use of a Web browser; use of dedicated application software for making reservations; and use of electronic mail, chatting, or the like.

On the reservation completion screen 56, information indicating settings of wireless communication available in the reserved location 18 is displayed. In this example, Wi-Fi is assumed to be used as wireless communication. On the reservation completion screen 56, setting information of Wi-Fi is displayed. For example, the SSID and the password of an access point 14 is displayed as the setting information.

When the user uses their terminal apparatus 16 to input the SSID and the password on a Wi-Fi setting screen, the terminal apparatus 16 may communicate with the access point 14 through Wi-Fi. As a result, the terminal apparatus 16 may establish a connection with the communication path N or another communication path through the access point 14.

On the reservation completion screen 56, for example, a start-of-use button 58 is displayed. The start-of-use button 58 is an image operated when Wi-Fi is used in the location 18. When the user presses the start-of-use button 58, the terminal apparatus 16 may communicate with the access point 14 and use Wi-Fi.

Figure 8:
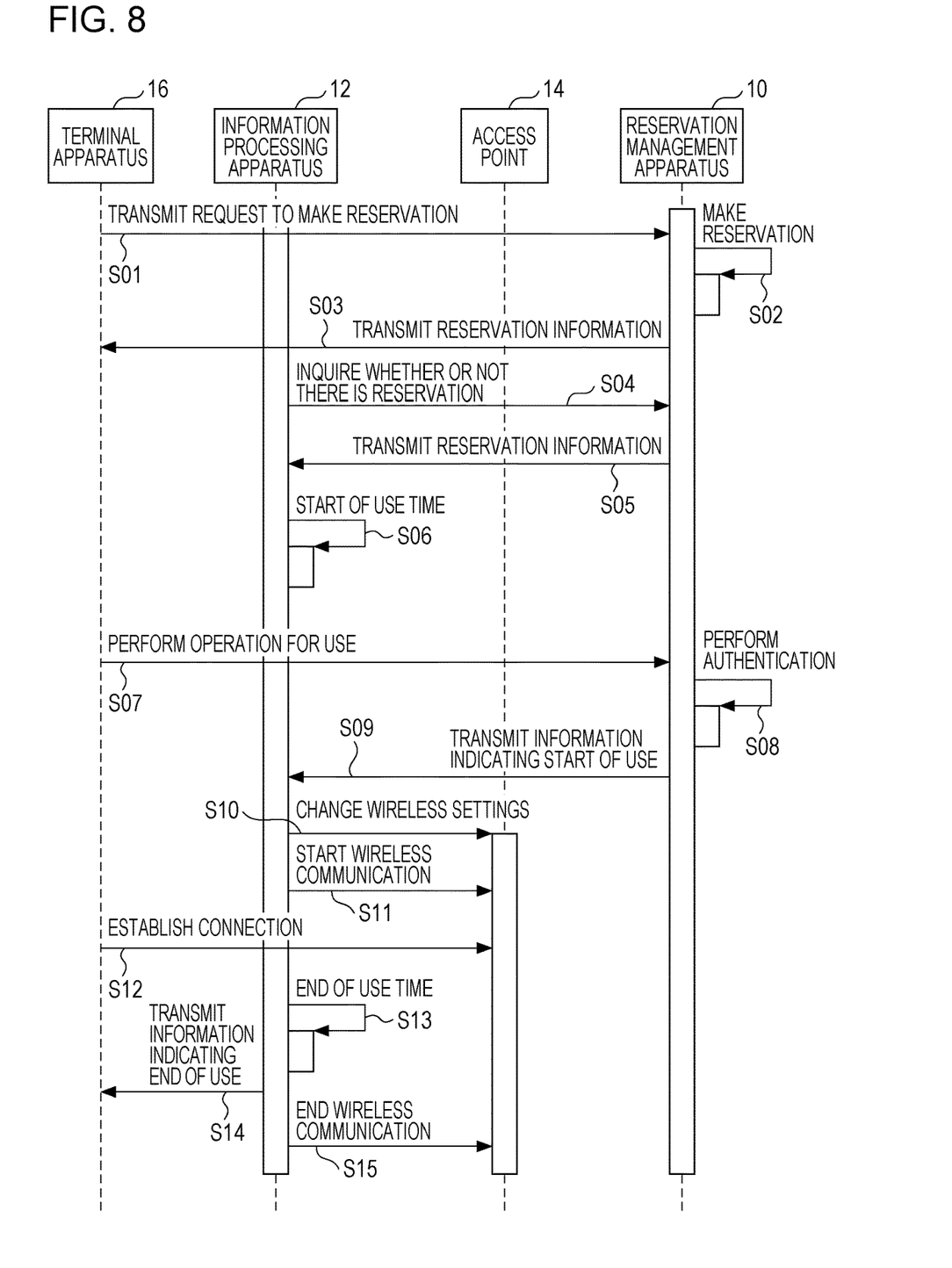
FIG. 8 is a sequence diagram illustrating the process flow performed in an information processing system according to the present exemplary embodiment.

Processes performed by the information processing system according to the present exemplary embodiment will be described in detail below by referring to FIG. 8. FIG. 8 is a sequence diagram illustrating the process flow.

Hereinafter, a booth, which is a private room, is assumed to be used as a location 18. The booth has a door which may be locked by using an electronic lock, and the electronic lock may be opened by using the utilization information described above. The booth may be located inside a building or the like, or may be located outside. In addition, an access point 14 is assumed to be capable of using Wi-Fi. The user C1 is assumed to reserve the booth.

The user C1 uses a terminal apparatus 16 to request a reservation for the booth which is a location 18 (S01).

For example, reservation application software has been installed in the terminal apparatus 16. When the user starts the reservation application software, the reservation application software communicates with the reservation management apparatus 10 through the communication path N, receives data of a reservation screen transmitted from the reservation management apparatus 10, and displays the reservation screen on the display unit of the UI unit 50 of the terminal apparatus 16. On the reservation screen, for example, a list of booths and a list of use times are displayed. The user selects a booth, which is to be reserved, from the list of booths on the reservation screen, and selects a use time, for which a reservation is to be made, from the list of use times. In this example, it is assumed that the booth A1 having the location ID "A1" is selected and that "April 1, 10:00 AM to 12:00 AM" is selected as a use time. When the user selects the booth and the use time, the reservation application software transmits the reservation request information to the reservation management apparatus 10. The reservation request information includes information indicating the selected booth, information indicating the selected use time, and user information of the user C1. The user C1 may specify settings of Wi-Fi provided by the access point 14 (for example, the SSID, the password, information about whether or not the SSID client isolating function is to be performed, and the communication speed) on the reservation screen. When the user C1 specifies settings of Wi-Fi, wireless-settings information, which indicates the settings, is transmitted to the reservation management apparatus 10 in such a manner as to be included in the reservation request information. In this example, the wireless settings D1 are specified or determined as settings of Wi-Fi.

Upon reception of the reservation request information transmitted from the terminal apparatus 16, the reservation management unit 24 of the reservation management apparatus 10 accepts a reservation of the booth during the use time which is indicated by the reservation request information (S02).

The reservation management unit 24 registers the reservation in the reservation management table illustrated in FIG. 6. In this example, the user C1 has selected the booth A1 and "April 1, 10:00 AM to 12:00 AM". Thus, this information is registered in the reservation management table.

When the user C1 has not specified settings of Wi-Fi, the reservation management unit 24 determines settings of Wi-Fi. Specifically, the reservation management unit 24 determines, for example, the SSID, the password, whether or not the SSID client isolating function is to be performed, and the communication speed of the access point 14 available in the booth A1. The reservation management unit 24 may determine predetermined settings as settings of Wi-Fi, or may determine randomly-determined settings as settings of Wi-Fi. For each reservation, the reservation management unit 24 may change a subset or all of settings of Wi-Fi. That is, for each reservation, the reservation management unit 24 may determine a different set of settings as settings of Wi-Fi. For example, the reservation management unit 24 changes the SSID and the password for each reservation. Thus, an SSID and a password which are different depending on each reservation may be determined as settings of Wi-Fi. Changing the SSID and the password for each reservation improves security in communication using the access point 14. The reservation management unit 24 may change one of the SSID and the password. A subset of settings of Wi-Fi may be determined by the user C1, and the other settings may be determined by the reservation management unit 24. For example, the user C1 may determine whether or not the SSID client isolating function is to be performed and the communication speed, and the reservation management unit 24 may determine the SSID and the password. As a matter of course, the user C1 may determine the SSID and the password, and the reservation management unit 24 may determine whether or not the SSID client isolating function is to be performed and the communication speed. In this example, the wireless settings D1 are specified or determined as settings of Wi-Fi, and wireless-settings information about the wireless settings D1 has been registered in the reservation management table.

When the reservation has been made, the reservation management unit 24 transmits the reservation information to the terminal apparatus 16 used by the user C1 (S03).

The reservation information includes, for example, wireless-settings information about settings of Wi-Fi, utilization information used to open the electronic lock of the door of the booth A1, and use time information indicating a use time. The utilization information is, for example, key information for opening the electronic lock of the door. The reservation management unit 24 may change the utilization information depending on each reservation. This utilization information is also registered in the reservation management table. In this example, the utilization information E1 is assumed to be registered as utilization information for using the booth A1.

The reservation application software in the terminal apparatus 16 receives the reservation information transmitted from the reservation management unit 24, and displays all or part of the reservation information on the display unit of the UI unit 50 of the terminal apparatus 16. For example, the reservation completion screen 56 illustrated in FIG. 7 is displayed on the display unit of the UI unit 50.

Instead of use of the reservation application software, a Web browser or electronic mail may be used to reserve a booth and receive/transmit reservation information.

For example, at predetermined time intervals, the controller 40 of each information processing apparatus 12 inquires, to the reservation management apparatus 10, whether or not there is a reservation of a location 18 where an access point 14 controlled by the information processing apparatus 12, which transmits the inquiry, is available (S04). Information indicating the inquiry is transmitted from the information processing apparatus 12 to the reservation management apparatus 10.

Upon reception of the information, which indicates an inquiry about a reservation, from the information processing apparatus 12, the reservation management unit 24 of the reservation management apparatus 10 refers to the reservation management table, and checks whether or not there is a reservation for the location 18 associated with the information processing apparatus 12.

When the location 18 has been reserved, the reservation management unit 24 transmits reservation information corresponding to the reservation, to the information processing apparatus 12 controlling the access point 14 available in the location 18 (S05). The reservation information is stored in the storage unit 34 of the information processing apparatus 12.

If the location 18 has not been reserved, the reservation management unit 24 transmits information indicating that the location 18 is not reserved, to the information processing apparatus 12.

A concrete example will be described. The controller 40 of the information processing apparatus 12 (hereinafter referred to as the "information processing apparatus 12B1") associated with the booth A1, that is, the information processing apparatus 12B1 controlling the access points 14 available in the booth A1, inquires, to the reservation management apparatus 10, whether or not there is a reservation of the booth A1. The booth A1 has been reserved by the user C1, and its use time is April 1, 10:00 AM to 12:00 AM. In this case, the reservation management unit 24 transmits, to the information processing apparatus 12B1, reservation information including wireless-settings information about settings of Wi-Fi corresponding to the reservation and use time information indicating the use time. The reservation information may include utilization information. The reservation information is stored in the storage unit 34 of the information processing apparatus 12B1.

Even if the reservation management unit 24 does not receive an inquiry from the information processing apparatus 12, when the reservation management apparatus 10 has reserved the location 18, the reservation management unit 24 may transmit reservation information to the information processing apparatus 12 associated with the reserved location 18.

The start time of the use time of the booth A1 arrives (S06), and the user C1 performs an operation to use the booth A1 (S07). Then, the reservation management apparatus 10 performs authentication for checking whether or not the user C1 is to be permitted to use the booth A1 (S08).

For example, the door of the booth A1 is locked by using an electronic lock. The door is provided with a wireless communication apparatus performing short-distance wireless communication. When the user C1 brings the terminal apparatus 16 close to the door, the terminal apparatus 16 uses short-distance wireless communication to transmit the utilization information included in the reservation information, to the wireless communication apparatus. When the user has reserved the booth A1, the reservation information has been transmitted from the reservation management apparatus 10 to the terminal apparatus 16, and is stored in the storage unit 52 of the terminal apparatus 16. The wireless communication apparatus receiving utilization information from the terminal apparatus 16 transmits, to the reservation management apparatus 10 through the information processing apparatus 12B1 or not through information processing apparatus 12B1, the utilization information and location identification information (for example, the ID "A1") of the booth A1 in which the wireless communication apparatus is located. The reservation management unit 24 refers to the reservation management table illustrated in FIG. 6, and checks whether or not the utilization information E1 matches the transmitted utilization information. The utilization information E1 is associated with the booth A1 indicated by the transmitted location identification information, and is associated with the use time including the current date and time.

If the transmitted utilization information is the same as the utilization information E1, the reservation management unit 24 permits the user C1 to use the booth A1. In this case, the reservation management unit 24 transmits information indicating an open-lock instruction, to the wireless communication apparatus provided for the door of the booth A1, through the information processing apparatus 12 or not through the information processing apparatus 12. According to the open-lock instruction, the electronic lock is opened. When the electronic lock is opened, the user C1 may open the door to enter the booth A1. The reservation management unit 24 transmits information indicating start of use of the booth A1, to the information processing apparatus 12B1 (S09).

If the transmitted utilization information is different from the utilization information E1, the reservation management unit 24 does not permit the user C1 to use the booth A1. In this case, the reservation management unit 24 does not transmit information indicating an open-lock instruction. As a result, the door of the booth A1 is not opened.

For example, if the current date and time is in the period, April 1, 10:00 AM to 12:00 AM, and if the transmitted utilization information is the same as the utilization information E1, the reservation management unit 24 permits the user C1 to use the booth A1. If the current date and time is in the period, April 1, 10:00 AM to 12:00 AM, and if the transmitted utilization information is different from the utilization information E1, the reservation management unit 24 does not permit the user C1 to use the booth A1. Even if the transmitted utilization information is the same as the utilization information E1, if the current date and time is not in the period, April 1, 10:00 AM to 12:00 AM, the reservation management unit 24 does not permit the user C1 to use the booth A1.

Processes in step S10 and its subsequent steps will be described below.

The setting unit 36 of the information processing apparatus 12B1, which has received the information indicating start of use of the booth A1, changes settings of Wi-Fi provided by the access point 14 available in the booth A1, according to the wireless-settings information included in the reservation information stored in the storage unit 34 of the information processing apparatus 12B1 (S10). Since the wireless settings D1 are registered as settings of wireless communication, the setting unit 36 changes the settings of Wi-Fi provided by the access point 14, to the wireless settings D1. The wireless-settings information indicating the wireless settings D1 is stored in the storage unit 44 of the access point 14.

The controller 40 of the information processing apparatus 12B1 starts Wi-Fi provided by the access point 14 available in the booth A1 (S11). Thus, the user C1 may use Wi-Fi provided by the access point 14.

When the user C1 inputs the SSID and the password, which are included in the reservation information, on the Wi-Fi setting screen on the terminal apparatus 16, the terminal apparatus 16 establishes a connection with the access point 14 available in the booth A1, and is capable of using Wi-Fi (S12). The terminal apparatus 16 may set the SSID and the password automatically.

The Wi-Fi settings may be changed by the user C1 in the use time. For example, when the user C1 uses the reservation application software to change the Wi-Fi settings, the Wi-Fi settings of the access point 14 are changed through the reservation application software, the reservation management apparatus 10, and the information processing apparatus 12. In addition, the communication speed may be changed. A high-speed line may be available as a charged option.

At the arrival of the end time of the use time (for example, 12:00 AM) (S13), the controller 40 of the information processing apparatus 12 transmits information indicating that the use time ends, to the terminal apparatus 16 using the access point 14 in the booth A1 (S14). The information indicating that the use time ends may be displayed on the display unit of the UI unit 50 of the terminal apparatus 16.

The controller 40 of the information processing apparatus 12B1 ends Wi-Fi provided by the access point 14 available in the booth A1 (S15). For example, the controller 40 stops Wi-Fi. As a result, the terminal apparatus 16 used by the user C1 is not capable of using Wi-Fi provided by the access point 14.

Instead of the controller 40 stopping Wi-Fi, the setting unit 36 may change the Wi-Fi settings of the access point 14 to settings other than the wireless settings D1. The settings other than the wireless settings D1 are, for example, the SSID and the password which have values selected randomly, or the predetermined SSID and password. Also in this case, the terminal apparatus 16, for which Wi-Fi settings are the wireless settings D1, is not capable of using Wi-Fi provided by the access point 14.

At the arrival of the end time of the use time for the user C1, when the user leaves the booth A1, the electronic lock of the door is closed. After that, as long as the electronic lock is not opened, a user is not allowed to enter the booth A1.

When, in the period, April 1, 1:00 PM to 2:00 PM, the user C2 uses the utilization information E1 to open the electronic lock of the booth A1, the Wi-Fi settings of the access point 14 are changed to the wireless settings D2 for the user C2. The terminal apparatus 16 used by the user C2 has received reservation information including wireless-settings information about the wireless settings D2. The user C2 changes the Wi-Fi settings of the terminal apparatus 16 to the wireless settings D2. Thus, the user C2 is capable of using Wi-Fi provided by the access point 14.

The settings of wireless communication available in the location 18 are changed in accordance with a user who has reserved the location 18. Thus, compared with the case in which fixed settings are used as settings of the wireless communication, security in use of the wireless communication is improved.

Modified Example

A modified example will be described below. In the modified example, users different from a user who has reserved a location 18 are permitted to use the access point 14 available in the location 18. For example, to a terminal apparatus 16 used by a different user, the reservation management apparatus 10 transmits address information for accessing reservation information including wireless-settings information, reservation information, or wireless-settings information. The different user may use the settings of wireless communication indicated by the wireless-settings information, so as to use the access point 14. The address information is, for example, a uniform resource locator (URL) indicating the location of a Web page in which reservation information and wireless-settings information are described.

A different user is, for example, a user who has been registered in the reservation management apparatus 10 when a user reserves a location 18. In addition, the user who has reserved the location 18 may register a different user or remove a registered different user from the registration in a period after the reservation till the end of the use time.

The modified example will be described in detail below.

Figure 9:
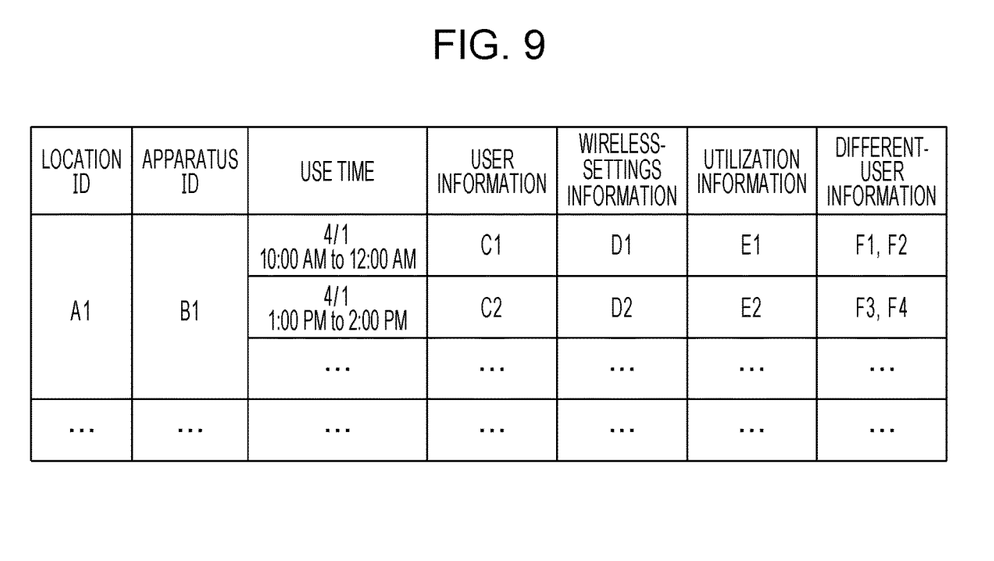
FIG. 9 is a diagram illustrating a reservation management table according to a modified example.

The reservation management information according to the modified example will be described by referring to FIG. 9. FIG. 9 illustrates an exemplary reservation management table which is exemplary reservation management information according to the modified example.

In the reservation management table according to the modified example, in addition to information registered in the reservation management table illustrated in FIG. 6, different-user information is associated with the location ID and the like for each location 18.

The different-user information is information about different users other than a user who has reserved a location 18, and is information about different users who are permitted to use the access point 14 available in the location 18. For example, the different-user information includes information, for example, about the electronic mail addresses or accounts of different users. The different-user information is registered, for example, by the user who has reserved the location 18.

In the example in FIG. 9, different-user information for the user F1 and different-user information for the user F2 are associated with the location ID "A1", the use time of "April 1, 10:00 AM to 12:00 AM", and the user C1. That is, the users F1 and F2 are permitted to use the access point 14 available in the location 18 having the location ID "A1", during the period, April 1, 10:00 AM to 12:00 AM.

Different-user information for the user F3 and different-user information for the user F4 are associated with the location ID "A1", the use time of "April 1, 1:00 PM to 2:00 PM", and the user C2. That is, the users F3 and F4 are permitted to use the access point 14 available in the location 18 having the location ID "A1", during the period, April 1, 1:00 PM to 2:00 PM.

For example, the electronic mail address of the user F1 is registered as different-user information for the user F1. Address information for accessing reservation information is transmitted from the reservation management apparatus 10 to the electronic mail address. When the user F1 uses a Web browser to access the address information, a Web page having the address information is displayed on a Web browser. The Web page describes reservation information and wireless-settings information. The user F1 may refer to the reservation information and the wireless-settings information. The user F1 may use the settings of wireless communication indicated by the wireless-settings information, so as to use the access point 14. The same is true for the users F2, F3, and F4. As a matter of course, reservation information and wireless-settings information may be transmitted to the electronic mail address of a different user.

Figure 10:
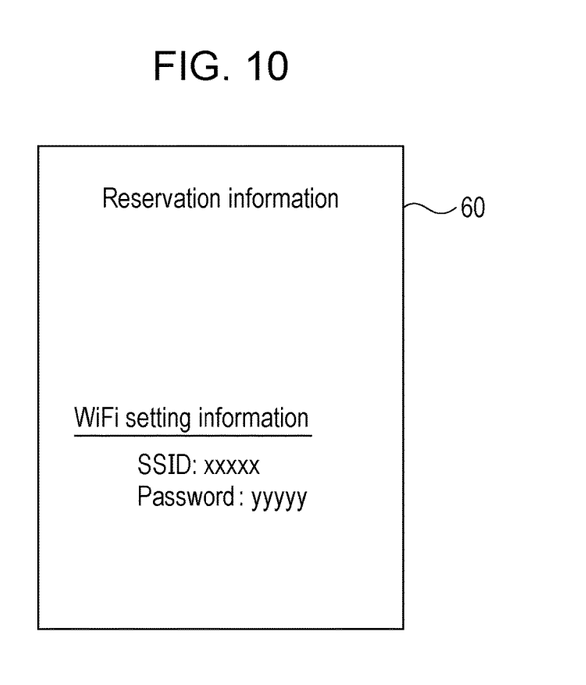
FIG. 10 is a diagram illustrating a screen.

FIG. 10 illustrates an exemplary Web page described above. A Web page 60 describes Wi-Fi setting information (for example, the SSID and the password) as wireless communication setting information. A different user may use the SSID and the password described in the Web page 60, so as to use the access point 14 for which the SSID and the password are set. The Web page 60 may describe, for example, information indicating the location of the available access point 14, information indicating the available date and time, information about a user who has reserved the location 18.

Figure 11:
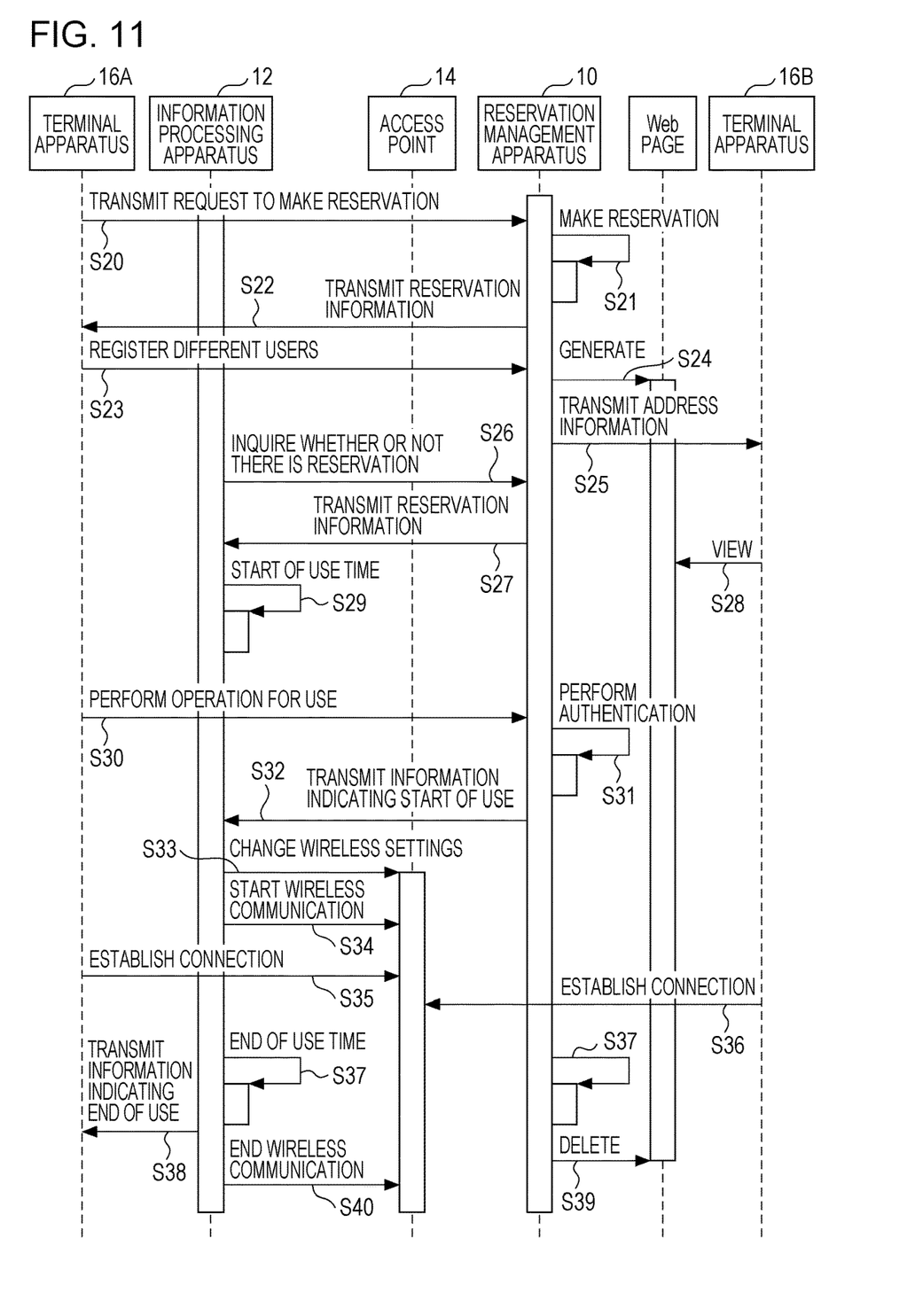
FIG. 11 is a sequence diagram illustrating the process flow according to a modified example.

Processes according to the modified example will be described in detail below by referring to FIG. 11. FIG. 11 is a sequence diagram illustrating the process flow. Similarly to the processes described by referring to FIG. 8, the user C1 is assumed to reserve the booth A1. It is assumed that the access point 14 enables Wi-Fi to be used. A terminal apparatus 16 used by the user C1 is referred to as the "terminal apparatus 16A". A terminal apparatus 16 used by a different user other than the user C1 is referred to as a "terminal apparatus 16B".

Steps S20, S21, and S22 are the same as steps S01, S02, and S03 illustrated in FIG. 8. In this example, it is assumed that the booth A1 is reserved and its use time is April 1, 10:00 AM to 12:00 AM.

The user C1 further registers different users on a reservation screen (S23). For example, the user C1 inputs the electronic mail addresses of the different users on the reservation screen. In this example, it is assume that the electronic mail addresses of the users F1 and F2 are input. The electronic mail addresses of the users F1 and F2 are transmitted from the terminal apparatus 16 used by the user C1, to the reservation management apparatus 10. The reservation management unit 24 registers the electronic mail addresses of the users F1 and F2 in the reservation management table in association with the reservation information (that is, the booth A1 which is a location 18, and "April 1, 10:00 AM to 12:00 AM" which is a use time) registered by the user C1.

The reservation management unit 24 generates a Web page on which the reservation information is provided (S24). The reservation management unit 24 transmits address information indicating the URL of the Web page, to the electronic mail addresses of the registered different users (S25). In this example, the address information is transmitted to the electronic mail addresses of the users F1 and F2.

Steps S26 and S27 are the same as steps S04 and S05 illustrated in FIG. 8.

The users F1 and F2 use their own terminal apparatuses 16B to access the Web page having the address information, and view the reservation information (for example, the SSID and the password) provided on the Web page (S28). For example, the Web page 60 illustrated in FIG. 10 is displayed on the display units of the UI units 50 of the terminal apparatuses 16B. The users F1 and F2 may know the SSID and the password provided on the Web page. This viewing may be performed at any time point after transmission of the address information to the electronic mail addresses of the users F1 and F2.

Steps S29 to S35 are the same as steps S06 to S12 illustrated in FIG. 8.

When the users F1 and F2 input the SSID and the password provided on the Web page, on the Wi-Fi setting screens of their own terminal apparatuses 16B, the terminal apparatuses 16B may establish connections with the access point 14 available in the booth A1 to use Wi-Fi (S36).

Steps S37 and S38 are the same as steps S13 and S14 illustrated in FIG. 8.

At the arrival of the end time (for example, 12:00 AM) of the use time (S37), the reservation management unit 24 of the reservation management apparatus 10 deletes the reservation information from the Web page on which the reservation information is provided (S39). Thus, even when different users (for example, the users F1 and F2) access the Web page, the reservation information provided in the past is not capable of being viewed. The reservation management unit 24 may delete the Web page itself. Thus, different users are not capable of accessing the Web page, and are not allowed to view the reservation information.

Step S40 is the same as step S15 illustrated in FIG. 8.

In the exemplary embodiment and the modified example described above, the setting unit 36 may make the function of wireless communication available in a location 18, close to the function available for a user who has reserved the location 18. The function of wireless communication indicates, for example, the communication speed or the communication standard. For example, assume the following case: a user may use the fifth generation mobile communication system (that is, the 5G) according to the user's communication contract; and the wireless communication available in the location 18 supports the fourth generation mobile communication system (that is, the 4G), but does not support the 5G. In this case, the setting unit 36 sets the function of wireless communication to the 4G. That is, the setting unit 36 uses the function of wireless communication available for the user, as the upper limit function, and sets the upper limit function to the function of wireless communication available in the location 18. In the case where a user is capable of using the 4G but is not capable of using the 5G, and where the function of wireless communication available in the location 18 supports the 4G and the 5G, the setting unit 36 sets the function of wireless communication to the 4G.

Locations 18 may be places other than booths. Like the exemplary embodiment and the modified example described above, the settings of wireless communication are changed in accordance with a user who has reserved the location 18. For example, when a person who has reserved a hotel room opens the key of the room, the settings of wireless communication available in the room are changed to the settings for this person. Places other than booths and hotels may also serve as locations 18.

The settings of wireless communication for each user may be fixed. For example, the reservation management apparatus 10 may store information of each user and his/her SSID and password in association. In this case, a user may use the same SSID and password to use wireless communication in any locations 18 he/she reserved, and in any reserved time frames he/she reserved. The SSID and password may be determined by the user themselves who uses the SSID and password, or may be determined by the reservation management apparatus 10 automatically.

The setting unit 36 of the information processing apparatus 12 may also change the communication settings of an apparatus located in the location 18, to the settings for the user who has reserved the location 18. For example, the setting unit 36 may change the communication settings of an apparatus (for example, an air conditioner, a lamp, or a printer) having a wireless communication function, to the settings for the user who has reserved the location 18 in which the apparatus is located.

Other than the settings of wireless communication, the setting unit 36 may change the environment of the location 18 in accordance with a user who has reserved the location 18. For example, the setting unit 36 may change the settings (for example, the temperature and the air volume) of an air conditioner located in the location 18, the settings (for example, the lightness and the color) of a lamp located in the location 18, and flavor in the location 18 in accordance with a user who has reserved the location 18.

The functions of the units of the reservation management apparatus 10, each information processing apparatus 12, and each terminal apparatus 16, which are described above, are implemented, for example, in cooperation with hardware and software. Specifically, the reservation management apparatus 10, each information processing apparatus 12, and each terminal apparatus 16 have one or more processors such as a central processing unit (CPU) (not illustrated). The one or more processors read and execute programs stored in a storage device (not illustrated). Thus, the functions of the units of the reservation management apparatus 10, each information processing apparatus 12, and each terminal apparatus 16 are implemented. The programs are stored in a storage device through a recording medium, such as a compact disc (CD) or a digital versatile disc (DVD), or through a communication path such as a network. As another example, the functions of the units of the reservation management apparatus 10, each information processing apparatus 12, and each terminal apparatus 16 may be implemented by using hardware resources, such as a processor, an electronic circuit, or an application specific integrated circuit (ASIC). In the implementation, a device such as a memory may be used. As another example, the functions of the units of the reservation management apparatus 10, each information processing apparatus 12, and each terminal apparatus 16 may be implemented by using a digital signal processor (DSP), a field programmable gate array (FPGA), or the like.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
 a processor programmed to:
  communicate with a wireless access point in a location, and
  change a setting of wireless communication of the wireless access point, in accordance with a reservation for the location from a user who has made the reservation.

2. The information processing apparatus according to claim 1,
 wherein the reservation includes use time information indicating a time frame during which the location is reserved by the reservation, and
 wherein the processor is programmed to change the setting of wireless communication after an arrival of a start time of the time frame.

3. The information processing apparatus according to claim 2,
 wherein the processor is programmed to change the setting of wireless communication in response to a user operation to use the location, the user operation being performed after the arrival of the start time.

4. The information processing apparatus according to claim 1, wherein the processor is programmed to change the setting of wireless communication to a setting specified at a time of making the reservation for the location.

5. The information processing apparatus according to claim 2,
wherein the processor is programmed to change the setting of wireless communication to a setting specified at a time of making the reservation for the location.

6. The information processing apparatus according to claim 3,
wherein the processor is programmed to change the setting of wireless communication to a setting specified at a time of making the reservation for the location.

7. The information processing apparatus according to claim 1,
wherein the setting of wireless communication is changeable by the user during a time frame reserved by the reservation.

8. The information processing apparatus according to claim 1,
wherein the processor is programmed to change the setting of wireless communication to different settings for different reservations of the location.

9. The information processing apparatus according to claim 1,
wherein the setting of wireless communication includes at least one of identification information of an access point in the wireless communication and a password for using the wireless communication.

10. The information processing apparatus according to claim 9,
wherein the setting of wireless communication further includes at least one of whether or not communication with a different apparatus through the wireless communication is allowed and a communication speed.

11. The information processing apparatus according to claim 1,
wherein, in response to the reservation being made, setting information required to use the wireless communication in the location during the time frame is transmitted to a terminal apparatus of the user who has made the reservation, the setting information being determined in accordance with the user.

12. The information processing apparatus according to claim 11,
wherein information related to the setting information is transmitted to a terminal apparatus used by a different user other than the user who has made the reservation for the location.

13. The information processing apparatus according to claim 12,
wherein the information related to the setting information is access information for accessing a Web page on which the setting information is provided, and
wherein, after an end time of the time frame, the Web page is deleted.

14. The information processing apparatus according to claim 1,
wherein the processor is further programmed to, in response to an absence of movement of an apparatus using the wireless communication in the location over a predetermined time or more, prohibit the use of the wireless communication.

15. The information processing apparatus according to claim 1,
wherein the processor further makes a function of the wireless communication closer to a function which the user is capable of using.

16. An information processing system comprising:
a reservation management apparatus; and
an information processing apparatus,
wherein the reservation management apparatus includes
a managing unit that manages a reservation for a location made by a user, and
a transmitting unit that transmits setting information for using wireless communication in the location to the information processing apparatus, the setting information being determined in accordance with the user, and
wherein the information processing apparatus includes
a changing unit that changes a setting of the wireless communication in the location according to the setting information.

17. The information processing system according to claim 16,
wherein the managing unit further manages time information indicating a time frame during which the location is reserved by the reservation, and, in response to a user operation for using the location being performed after a start time of the time frame, permits the user to use the location, and
wherein, in response to the user being permitted to use the location, the changing unit changes the setting of wireless communication.

18. The information processing system according to claim 16,
wherein the transmitting unit further transmits the setting information to a terminal apparatus used by the user.

19. The information processing system according to claim 18,
wherein the transmitting unit further transmits information related to the setting information to a terminal apparatus used by a different user other than the user who has reserved the location.

20. A non-transitory computer readable medium storing a program causing a computer to execute a process, the process comprising:
communicating with a wireless access point in a location, and
changing a setting of wireless communication of the wireless access point in accordance with a reservation for the location from a user who has made the reservation.

21. An information processing system comprising:
a reservation management apparatus; and
an information processing apparatus,
wherein the reservation management apparatus includes a processor programmed to:
manage a reservation for a location made by a user, and
transmit setting information for using wireless communication in the location to the information processing apparatus, the setting information being determined in accordance with a reservation for the location from the user, and
wherein the information processing apparatus includes:
a second processor programmed to change a setting of the wireless communication in the location according to the setting information.

* * * * *